C. G. PORTER.
DIVIDING STAIRS.
APPLICATION FILED NOV. 3, 1917.

1,300,010.

Patented Apr. 8, 1919.

Witnesses
L. B. James

Inventor
C. G. Porter
By Victor J. Evans
Attorney

UNITED STATES PATENT OFFICE.

CLAUDE G. PORTER, OF SEAFORD, DELAWARE.

DIVIDING-STAIRS.

1,300,010.   Specification of Letters Patent.   Patented Apr. 8, 1919.

Application filed November 3, 1917. Serial No. 200,135.

*To all whom it may concern:*

Be it known that I, CLAUDE G. PORTER, a citizen of the United States, residing at Seaford, in the county of Sussex and State of Delaware, have invented new and useful Improvements in Dividing-Stairs, of which the following is a specification.

This invention has reference to directing means designed for use in connection with an endless conveyer, whereby articles to be arranged upon the conveyer may be accurately directed to a plurality of machines and arranged in close proximity to the conveyer, so that the said articles can be operated upon by the said machines.

My improvement is primarily, but not necessarily, adapted for application in connection with the seaming machines for cans or utensils in which the cans are to be delivered to the machines by an endless conveyer. The operation of both of the machines on the can is similar, and the primary object of the invention is to provide means whereby an equal number of cans may be properly delivered to each of the machines, and to accomplish this, I arrange adjacent to the receiving end of the belt, a revoluble member which may be actuated by the means which operates the belt and which is provided with a plurality of radially disposed arms, the outer ends of each of the arms being formed with curved fingers, certain of the cans, from the delivery means to the belt being received between the fingers, the other cans being received between the arms to arrange the same near the periphery of the dividing member, so that certain of the cans will be arranged adjacent, say the outer edge of the conveyer, by the fingers, and the other cans will be arranged adjacent the inner edge of the conveyer by the arms, suitable guides being positioned over the conveyer at or adjacent to each of the machines to cause the divided cans to travel upon the respective machines.

A further object of the invention is to produce a device of this character which shall be of an extremely simple nature, cheap to manufacture, and which will perform the functions for which it is designed with efficiency and with accuracy.

Figure 1:
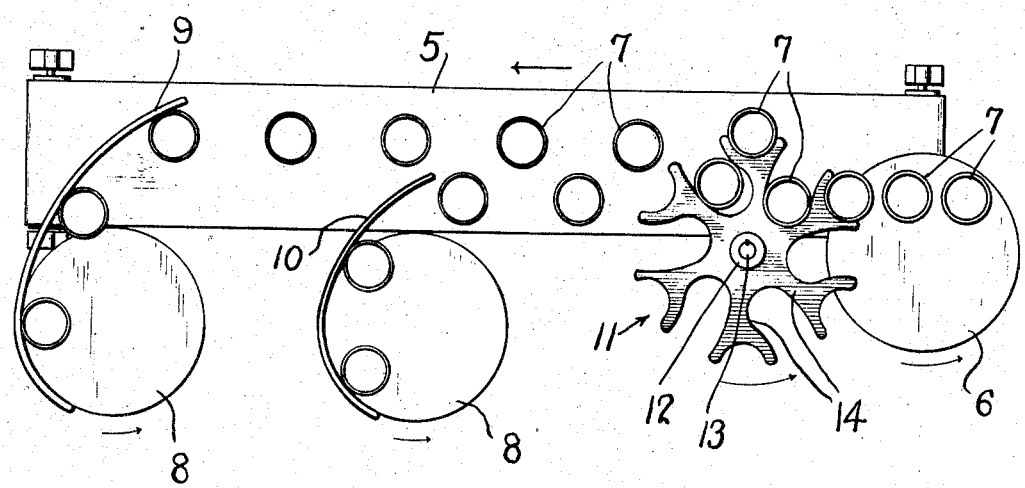
Figure 2:
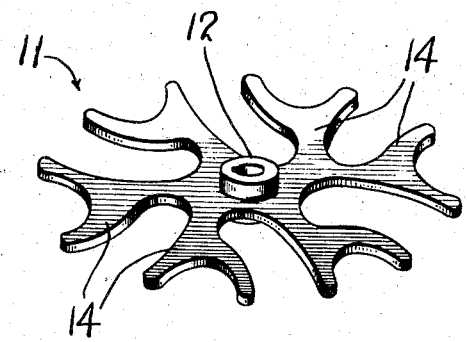

Other object and advantages will present themselves as the nature of the invention is more fully understood, reference being had to the accompanying drawing, in which, Figure 1 is a plan view illustrating the application of the improvement, and Fig. 2 is a perspective view of the dividing member or spider.

The conveyer 5 is in the nature of an endless member, traveling over suitable rollers at the ends thereof and receiving motion from any desired or suitable source of power. Arranged adjacent one end of the conveyer is a delivery table 6 upon which are arranged cans 7 that are designed to be delivered to the conveyer and to be directed by the said conveyer to the tables of a plurality of machines 8 respectively. The machines 8 may be operated on the cans to seam the same, to cap the same, or perform any other function desired, so that details of these machines will not be entered. Either connected to the tables of the machines 8 or secured adjacent thereto are curved arms 9 and 10 respectively, the curved arm 10 being of a less length than the arm 9, the arm 9 being secured to the table of the outer machine and the arm 10 being secured to the table of the machine nearer the delivery table 6. Both of these arms are arranged over the endless conveyer 9, the arm 10 terminating approximately centrally of the said conveyer and the said arms are directed to be contacted by the cans 7 on the conveyer to direct the said cans to the respective machines 8.

It will be apparent that were the cans arranged carelessly on the conveyer, a greater number of cans would be delivered to one of the machines than to the other and as the workman at one of the machines is expected to perform an equal amount of labor to the workman at the other machine, and also to obviate the necessity of having the cans placed by the operator or workman, at the table 6 in a proper position so that the same will be contacted in equal numbers by the arms or directing members 9 and 10, I provide a directing or dividing element which is broadly indicated by the numeral 11 and which is arranged between the delivery table 6 and the work or machine table 8 nearest the said delivery table. The member 11 includes a hub 12 in which is keyed a shaft 13 and this shaft may revolve in any desired or preferred manner, as for instance, the motive power for actuating the conveyer 5 may be employed to revolve the shaft 13. The hub 11 has radiating therefrom an equal number of curved arms 14. The arms gradually increase in width from their inner to their outer ends, and the connecting walls between each pair of arms are rounded inwardly, as at 15. The passages 16 between the arms are arranged angularly with respect to the center of the hub 12 as clearly illustrated by the drawings. One of the sides or edges of each of the arms is struck at a slow curve from the inner rounded portion 15 thereof, as indicated by the numeral 17, but the opposite side or edge of each of the arms 14 is rounded inwardly and then outwardly, as at 18, from the curved edge 17 of the adjacent arm in each of the passages 16. This provides the outer portions of each of the passages with what may be termed a flared mouth, while the inwardly rounded portions 18 also provide an obstruction or contact for the cans 7 to prevent the same leaving the passages 17 by the influence of the belt except when the said passages are arranged at a determined position with respect to the conveyer 5 upon which the said cans travel. The outer and widened end of each of the arms 15 is rounded or concaved inwardly, as at 19, providing the outer ends of each of the arms with spaced fingers 20, and the outer end of each of these arms is formed with curved fingers. The member 11 is designed to operate over the conveyer 5 and certain of the cans from the delivery table 6 are moved therefrom to be received in the concavities 19 between the fingers 20, the other cans being received in the passages 16 between the adjacent arms 14 of the dividing member or stair. The first mentioned cans, by the rotary movement of the dividing member, will be disposed toward the outer edge of the conveyer 5 so that the same will be contacted by the arm or directing member 9 and delivered to the outer machine 8. The other cans received between the arms of the dividing member will be directed upon the conveyer adjacent what may be termed the inner edge thereof so that the same will be delivered by the conveyer to a position to be contacted by the directing member 10 and to be directed thereby to the machine 8 nearest the table 6 or to the table of the said machine.

While I have stated that the stairs 11 may be revolved by the shaft 13, it is, of course, to be understood that the stairs may be loosely journaled on the shaft, receiving no momentum therefrom, but revoluble there-around. The actuating means for the stairs comprises a can 7 delivered thereto by the table 6 and the movement of the belt 5. The cans to be delivered to the outer machine 8 are, of course, received between the fingers 20, and the cans to be delivered to the inner machine 8 are received in the passages 16. The cans upon the belt might have a tendency to travel from the passages 16 outward of the stairs, by the movement of the belt 5, so that the inner series of cans might thus be delivered adjacent to the outer edge of the belt 5 and some of the cans destined for the inner machine 8 would thus be delivered to the outer machine 8. This is prevented by the cans contacting with the inwardly rounded edges 18 of the arms of the stairs, so the cans cannot leave the passages 16 until the said passages are arranged in one position, to properly allow the cans to travel therefrom by the belt 5, so that an accurate delivery of both series of cans is thus effectively provided for. It will be further apparent that were the passages 16 arranged radially, or directly from the axis of the hub, the stairs would have to be pivoted directly over the belt 5, and by arranging the said passages tangentially with respect to the longitudinal axis of the hub the stairs may, as shown in the drawings, be pivoted to one side of the belt 5.

From the foregoing description, when taken in connection with the accompanying drawing, the simplicity and advantages of the construction, will, it is thought, be apparent without further detailed description.

The cans may be arranged in chutes on the delivery table so that the same will be directed to one position with respect to my improvement, so that the cans will be successively engaged by the arcuate fingers on the ends of the arms and between the arms of the device.

Having thus described the invention, what I claim is:

1. A dividing stairs for cans, as set forth, comprising a flat member centrally provided with a hub designed to receive a pivot, said member having an equal number of curved arms radiating from the hub thereof, said arms being gradually increased in width from their inner to their outer ends, the connecting member between the adjacent arms being rounded inwardly and the passage between the arms being off of the center of the hub, one of the sides of the arms in each of the passages between the arms being rounded inwardly with respect to the said passage and thence rounded outwardly, and the widened ends of each of the arms being concaved inwardly providing the outer edges of the said arms with spaced fingers.

2. A dividing stairs for cans as set forth, comprising a flat member centrally provided with a hub, equally spaced arms radiating from said hub, said arms, at the outer ends thereof being widened and provided with concaved inner edges forming fingers at the ends of the said arms, the outer edge of one of the fingers being in a line with one of the inner edges of the arm on which it is formed, and the second finger having its outer edge arranged angularly with respect to the arm on which it is formed, and the last referred to outer edge of the finger being curved.

In testimony whereof I affix my signature.

CLAUDE G. PORTER.